Figure 1:
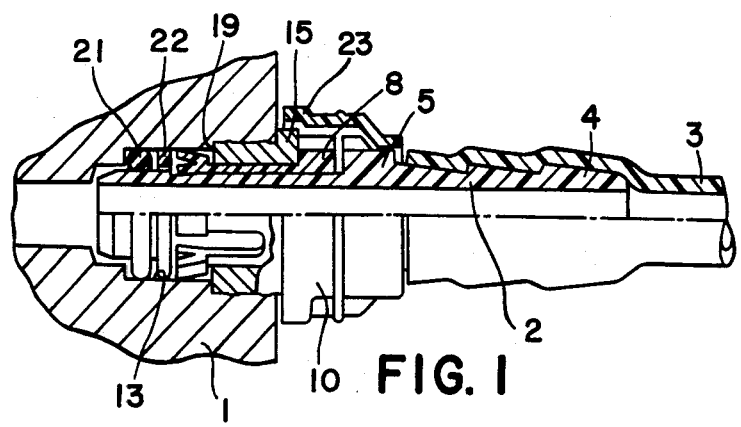

United States Patent [19]

Oliver

[11] Patent Number: 4,696,495
[45] Date of Patent: Sep. 29, 1987

[54] PIPE FITTING ASSEMBLY

[75] Inventor: Patrick R. Oliver, Bristol, Great Britain

[73] Assignee: Bendix Limited, Bristol, Great Britain

[21] Appl. No.: 897,965

[22] Filed: Aug. 19, 1986

[51] Int. Cl.⁴ ............................................. F16L 27/00
[52] U.S. Cl. ...................................... 285/86; 285/281; 285/319
[58] Field of Search ................... 285/319, 323, 86, 281

[56] References Cited

U.S. PATENT DOCUMENTS

| | | | |
|---|---|---|---|
| 2,869,099 | 1/1959 | Robinson | 285/319 X |
| 3,640,552 | 2/1972 | Demler, Sr. et al. | 285/319 X |
| 3,743,326 | 7/1973 | Courtot et al. | 285/323 X |
| 3,963,267 | 6/1976 | Legris | 285/323 X |
| 4,448,447 | 5/1984 | Funk et al. | 285/319 X |
| 4,541,658 | 9/1985 | Bartholomew | 285/319 |
| 4,573,716 | 3/1986 | Guest | 285/323 |

FOREIGN PATENT DOCUMENTS 0059877  2/1982  European Pat. Off. .

Primary Examiner—Thomas F. Callaghan
Attorney, Agent, or Firm—Ken C. Decker; William N. Antonis

[57] ABSTRACT

A pipe fitting comprising a first part (1) with a rotatable insert (15) axially located therein by an annular abutment face (19) and having resiliently radically deflectable abutment faces (12a) which are engageable with ends (7a) of notches (7) of a second tubular part (2), rotation of the insert relative to the tubular part (2) enabling the abutment faces (12) to ride out of the notches (7) to permit release of the tubular part (2) from the first part (1).

9 Claims, 3 Drawing Figures

U.S. Patent  Sep. 29, 1987  4,696,495

PIPE FITTING ASSEMBLY

This invention relates to pipe-fitting assemblies specifically of a quick fit type wherein a flexible pipe fluid pressure connection can be instantly and simply made but which is nevertheless readily radily dismantled for subsequent servicing or replacement.

In vehicle compressed air braking systems a number of connections are made via flexible nylon, plastics or synthetic rubber pressure pipes and it is desirable that connections of such pipes may be reliably strongly and rapidly made on a vehicle assembly line and yet be subsequently releasable for component servicing or replacement.

According to the present invention there is provided a pipe fitting assembly comprising a first part having an aperture receiving a second part for effecting a pipe connection therewith said first part having a rotatable insert through which an inner end of the second part can pass, said insert having means axially locating it in the aperture and abutment means engageable with respective abutment means of the second part in a sense to oppose withdrawal thereof from the first part said abutment means being disengageable by rotation of the insert relative to the second part.

In a preferred arrangement the rotatable insert may have one or more resiliently deflectable radially inwardly effective abutments engageable in corresponding recesses of the second part rotation of the insert being effective to cause each such abutment to ride out of the respective recess.

Preferably, an outer sleeve or other such means are provided for rotationally locating the insert relative to the second part.

Figure 2:
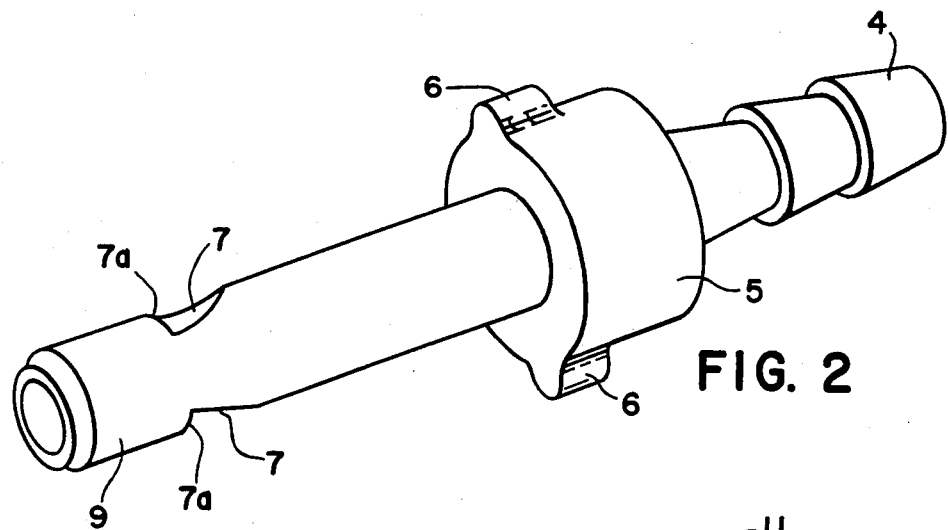
Figure 3:
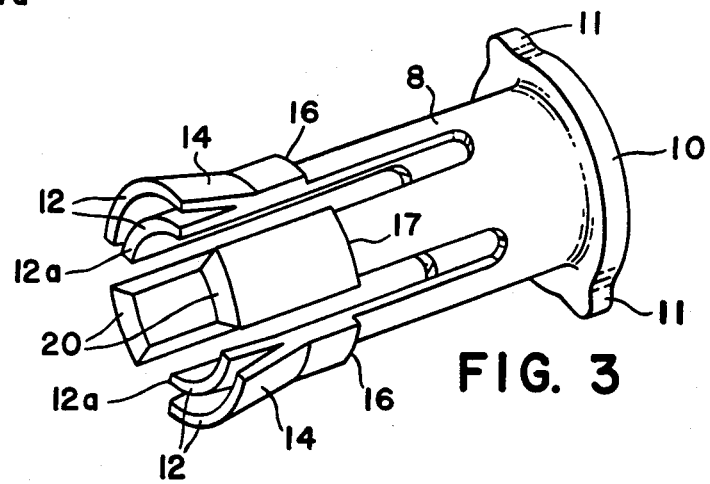

In order that the invention may be more clearly understood and readily carried into effect it will now be further described by way of an example with reference to the accompanying drawing of which:

FIG. 1 illustrates a diagrammatic sectional view through a pipe fitting assembly, FIG. 2 illustrates on enlarged scale an inner or second part of the assembly and, FIG. 3 illustrates on the same enlarged scale a rotatable insert of the assembly.

Referring to the drawing the assembly illustrated is intended for use in providing a piped compressed air connection to a control valve or other compressed air component of a vehicle compressed air brake system. The compressed air component comprises a first part 1 to which a compressed air connection is required to be made with a second generally tubular part 2. The part 2 shown also in FIG. 2 has an internal diameter which is substantially the same as a nylon tube 3 pressed tightly over a barbed or otherwise annularly ridged outer end 4. An intermediate flange portion 5 of somewhat larger diameter is provided with diametrically opposite positioned locating tongues 6 and the inner end is provided with notches 7 shaped to cooperate with radially inwardly effective abutments 12a of a rotatable insert 8. As will be seen these detents and recesses provide engageable abutments acting in a sense to prevent withdrawal of the second part (2) from the aperture.

The rotatable insert 8 is a resilient plastics moulding which is generally tubular to slidingly accept the inner end 9 of the tubular second part. An outer flange 10 of the insert (as more clearly shown in FIG. 3) is of the same external diameter and circumferential shape as flange portion 5 in that it has correspondingly diametrically located tongues 11. The inner end of the insert 8 is also a plastic moulding and is divided by axial slots into four portions one diametral pair 14 having bi-forked ends 12 being such as to resiliently rest as shown in FIG. 1 between notches 7 and the inner surface 13 of the aperture. The inner end surfaces 12a of bi-forked ends 12 thereby provide abutments engageable with abutments 7a presented by notches 7. Retaining means in the form of a pressed-in flanged bush 15 presents an inwardly facing annular abutment 19 for the outward facing surfaces 16 of the ends 12 to prevent axial movement of the insert. The other diametral pair of portions 20 serve as centralising pads for the second part and also offer further abutments 17 engageable with 19. In putting the assembly together, the suppliers of the component 1 may insert an inner 'O' ring 21 together with a retaining ring 22 before pressing in the retaining bush member 15. Owing to the resilient moveable inner ends of the insert 8 this can then be snapped into place. Nylon connection pipes such as 3 can be provided with a sleeve 23 and the pressed-in second part 2. These are then ready for immediate push-in connection into the first part 1, the outer sleeve 23 being shaped to be finally slidingly positioned over 5 and 10 with the tongues 6 and 11 aligned.

In the aligned position of 6 and 11 the abutment ends 12a provide engagement with the notch ends 7a to prevent withdrawal of the inner or second part. For servicing, the outer sleeve 23 can be moved back along the pipe 3 to permit the insert 8 to be rotated through ninety degrees whereby parts of the ends 12 carrying abutments 12a ride out of the recesses 7, thereby disengaging the effective abutments and permitting withdrawal of the second part 2 to be separated from the assembly.

I claim:

1. A pipe fitting assembly for rotatably securing a pipe in an opening in a housing, said pipe fitting assembly including a first part carried in said opening and a second part connected to said pipe, said first part including a member nonrotatably mounted in said opening and an insert carried by said member, and rotatable with respect thereto, said insert and said member including cooperating means for preventing axial withdrawal of the insert from said member, said insert defining an aperture slidably receiving said second part, first abutment means on said insert cooperating with second abutment means on said second part to oppose withdrawal of said second part from the first part by locking said second part to said insert, said first and second abutment means including releasing means responsive to rotation of said insert relative to said second part to disengage said first and second abutment means to permit withdrawal of said second part from the insert.

2. A pipe fitting assembly as claimed in claim 1 including locating means for locating said insert in a predetermined angular position about its axis relative to the second part.

3. A pipe fitting assembly as claimed in claim 1, wherein said member cooperates with said housing to define an abutment surface, said insert including a projecting portion for engagement with said abutment surface to prevent axial withdrawal of said insert while permitting rotations of the latter relative to said member.

4. A pipe fitting assembly as claimed in claim 1, wherein said insert and said second part include projecting tongues locating said second part and said insert circumferentially with respect to one another, said first and second abutment means engaging one another to lock the second part in the insert when the tongues are aligned circumferentially with one another, and a sleeve slidably axially on the second part, said sleeve fitting over said tongues when the latter are aligned with each other.

5. A pipe fitting assembly as claimed in claim 1, wherein said second abutment means includes an abutment surface facing toward said member, said first abutment means engaging said last-mentioned abutment surface.

6. A pipe fitting assembly as claimed in claim 5, wherein said first abutment means includes a resiliently deflectable arm yieldably biased to engage said last-mentioned abutment surface, but deflecting radially upon rotation of said insert relative to said second part.

7. A pipe fitting assembly as claimed in claim 6, wherein said second abutment means is a notch on said second part, said abutment surface being defined as one edge of said notch.

8. A pipe fitting assembly as claimed in claim 6, wherein said second abutment means includes diametrically opposed notches on said second part, said abutment surface being defined as one edge of each of said notches.

9. A pipe fitting assembly as claimed in claim 7, wherein said releasing means includes edges of said notch other than the edge defining the abutment surface, said other edges engaging said arm to force the latter out of the notch and away from the abutment surface upon rotation of the insert relative to the second part.

* * * * *